United States Patent Office 3,297,931
Patented Jan. 10, 1967

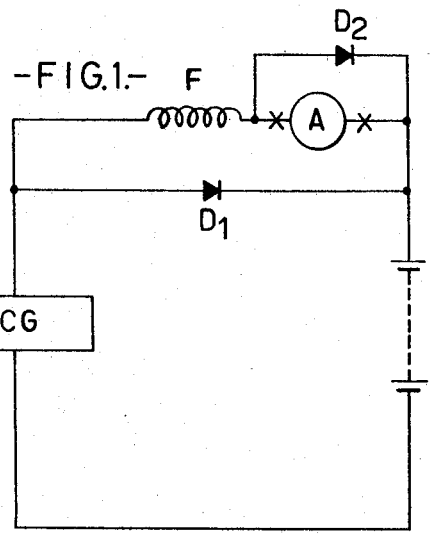
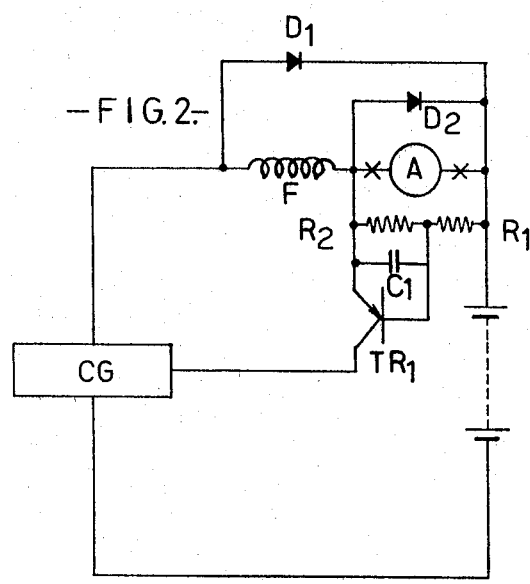

3,297,931
PULSE OPERATED CONTROL FOR DIRECT CURRENT ELECTRIC MOTORS
David Gurwicz, Gateshead, England, assignor to Sevcon Engineering Limited, Gateshead, England
Filed Oct. 19, 1964, Ser. No. 404,865
Claims priority, application Great Britain, Nov. 22, 1963, 46,121/63
2 Claims. (Cl. 318—380)

This invention is for improvements in or relating to pulse operated control means for direct current electric motors, and is particularly although not exclusively concerned with such control means for battery operated electric motors of electrically propelled vehicles such as delivery trucks.

The invention is designed to overcome problems which can arise when the motor is "plugged" i.e. braked by changing over the connections so that it tends to run in the reverse direction.

Control systems for a direct current electric motor are known comprising a controlled rectifier pulse generator circuit including a capacitor and having means for connecting it between a battery with direct current supply and the motor to be controlled, and means for adjusting the pulse frequency and thereby the mean power applied to the motor. Such a system is hereinafter referred to as a system of the character above set forth. In some cases means are provided in the circuit for maintaining current flow through the inter-pulse periods. Means may also be provided in the circuit to stop the "inductive effect" of the battery reducing the stored charge in the capacitor and thereby preventing turn-off of the controlled rectifier.

Conveniently the pulse generator circuit is a transistorised variable frequency pulse generator the pulses from which are used to trigger the gate of a gated diode (e.g. a silicon controlled rectifier) which in turn controls the flow of current to the motor or motors.

The current carrying capacity of a system as just set forth is governed by two factors. Firstly, the mean and peak current ratings of the gated diodes or silicon controlled rectifiers themselves, which is mainly a question of device size and heat sink capacity, and secondly the peak switch-off capacity available. The latter is dependent on the magnitude of the stored charge in the commutating capacitors. It is this stored charge which sets a limit to the peak current which may be switched in each pulse.

Under normal operation, the maximum peak current obtainable is limited by the motor inductance, motor resistance and battery output impedance. The above limitations apply when the motor is stalled. A further limitation is introduced when the motor is running, i.e. the back E.M.F. generated by the armature, which is a large factor in the limitation of the peak currents which the controller is required to carry. With the motor stalled, at relatively low pulse rates the motor inductance limits the peak current, however, at very high pulse rates the peak current limitation is imposed by the motor resistance and the battery output impedance. Due to magnetic field saturation the current limitation previously imposed by the motor inductance is no longer available. If at any time the peak current flowing is greater than the switching capacity of the unit, the controller will lose control.

During normal operation, as previously mentioned, the armature generates a back E.M.F. proportional to the product of the speed and the field flux density. During the interpulse period this back E.M.F. opposes the current flow, which is maintained via a diode connected across the series motor, by the self inductance of the series field and the interpoles, if any. This results in the decay of current, during the interpulse period, from a maximum value to a value determined by the speed and the length of the interpulse period. If the armature is not rotating then the inductive circuits within the motor will maintain current flow without the opposition of the armature generated back E.M.F. This will result in a smaller collapse of current in the interpulse period and hence larger peak currents are available.

When the motor is plugged, however, the reversal of either the armature or the series field connections causes the armature to generate an E.M.F. which assists the applied voltage. After the termination of an "on" pulse, the armature will continue to generate via the above mentioned diode and the series field thus increasing the field flux density and hence the generated E.M.F. The system is obviously now unstable and the current will rise within the motor to a value given by the generated armature voltage divided by the motor resistance. The armature voltage will be given by the product of speed and saturation flux density of the motor field. Apart from bringing the truck to a very rapid halt, the current that will flow, via the gated diode or silicon controlled rectifier control gear, when the next "on" pulse is initiated will be given by the sum of the battery voltage and generated E.M.F. divided by the sum of the motor resistance and battery output impedance. This current is obviously greater than the stall current of the motor and unless the control gear has been very highly rated the controller will lose control.

An object of the present invention is to modify a system as above described so as to eliminate the difficulty just referred to, which would otherwise arise when the motor is plugged.

A control system of the type described in which the motor armature is provided with a reversing switch for "plugging" or braking, and a rectifier connected across the armature and reversing switch in such a direction as to be conductive during braking periods.

The possibility of the motor becoming unstable is prevented by connecting a diode across i.e. parallel with the motor armature. Since current limitation is then dependent entirely on the inductance of the series field a rapid pulse rate is inadmissable and to prevent the pulse rate rising above a critical value a smoothing circuit is conveniently employed which feeds the base of a transistor the output of which prevents the normal action of the delay circuit. The result is that the controller plugs at a predetermined "crawl" rate throughout the plugging operation. When the plugging operation is complete the truck having been brought to a halt, the truck will accelerate as normally in the reverse direction.

Alternatively the invention may be carried into effect by preventing the re-operation of the "on" silicon controlled rectifier if a truck or other vehicle driven by the motor is rolling in the opposite direction to that selected by the reversing control. For instance, on compound motors where a shunt field is available to permit the armature to generate E.M.F. even when the gated diode or silicon controlled rectifier is open, the sense of this generated E.M.F. will depend on both the direction in which the truck is rolling and the selected direction. It is then possible to utilise the generated E.M.F. to operate a relay which in turn prevents the operation of the controlled rectifier.

A similar method may be employed with a series motor, using the generated E.M.F. from the armature to operate similarly an amplifier which in turn operates a relay. In the case of a series motor, there being no shunt field available, it is assumed that sufficient remnant field is available for a small generated E.M.F. to be produced. Whilst this method is feasible it is not entirely satisfactory, in all installations, because it relies on a residual magnetic field which cannot be accurately forecast and will vary between motor and motor and will also vary depending on the application the truck has been used for, prior to plugging.

Reference should now be made to the accompanying drawings in which:

FIGURE 1 is a schematic drawing of a first embodiment of the subject invention; and FIGURE 2 is a schematic drawing of a second embodiment of the subject invention.

As shown in FIGURE 1 a diode D2 is connected across the armature A of the motor, the armature having a reversing switch shown as X—X. This diode does not interfere with the normal operation of the control gear, but prevents the series generator action mentioned previously. When the armature connections are reversed or plugged by the switch, the generated armature current will flow via this diode and the series field and not via diode D1, which is provided to maintain current flow through the field F during the inter-pulse periods. The result is that the system is no longer unstable and the motor will not self excite. However, in this condition the armature may be considered as being effectively short circuited whilst it is being plugged. With the armature effectively short circuited the main factor in the limitation of peak pulse currents through the pulsed silicon controlled rectifier is that of motor inductance. Since a rapid pulse rate would permit sufficient current to flow through the series field to saturate it and therefore reduce its effective inductance, the controller must be prevented from pulsing rapidly whilst the truck is being plugged. In fact a rapid pulse rate, apart from producing high peak currents via the control gear, would produce such an intense magnetic field as to cause extremely high currents to be generated by the armature via D2, thus bringing the truck to an extremely rapid halt. An arrangement to prevent a rapid pulse rate during plugging is shown in FIGURE 2 of the accompanying drawing. It will be appreciated that the armature, whilst generating via D2, will have a small voltage drop across it. The drop across the armature will be due to two components, firstly that due to the knee of the diode characteristic, typically 0.6 to 0.7 volt with silicon diodes, and secondly there will be the normal ohmic drop across diode D2 whilst conducting heavy currents. The purpose of R1, R2 and C1 is to sample this voltage and produce a smoothed D.C. output proportional to it. The output voltage from the smoothing network is then fed into the base of transistor TR1. The collector of this transistor feeds the delay circuit of the control gear. Any transistor current greater than zero is of sufficient magnitude to prevent the delay circuit from increasing the pulse rate. The result is that the controller remains pulsing at the pre-set "crawl" level throughout the pulsing period. This pre-set "crawl" is selected to bring the truck to a controlled non-violent stop. This amount of braking torque produced by the motor is not under the control of the driver and he can in no way exceed the safe braking torque imposed by the designer of the equipment. In some applications it may be preferable to allow the operator to have some control over this braking torque during plugging operation, and a potentiometer connected to his brake pedal could be arranged to provide this control. When the plugging action has been completed i.e. the truck has been brought to a halt, the truck will then re-accelerate in the reverse direction at a rate set by the delay circuit of the unit, if the armature connection is not reversed.

I claim:

1. A braking system for an electric motor with a field and an armature, in which the connections to one of these components are reversed during braking, comprising: a pulse control device acting to control the mean current passing through said motor; a diode connected across said armature so as to be non-conducting during driving periods; means for deriving a potential which is a predetermined fraction of the potential across said diode; and means for applying said derived potential to said pulse control device to limit the mean current passed by said device only during braking periods.

2. A braking system as claimed in claim 1 wherein a potentiometer is connected across said diode to derive said predetermined potential, and a smoothing circuit and transistor amplifier are connected between said potentiometer and said pulse control device.

References Cited by the Examiner

UNITED STATES PATENTS

| 2,912,632 | 11/1959 | Turtil | 318—380 X |
| 2,965,827 | 12/1960 | Hohne | 318—380 |
| 3,181,048 | 4/1965 | Ficek et al. | 318—246 |

FOREIGN PATENTS 452,948    9/1936    Great Britain.

ORIS L. RADER, *Primary Examiner.*

J. C. BERENZWEIG, *Assistant Examiner.*